United States Patent
Yamashita et al.

[11] Patent Number: 5,886,961
[45] Date of Patent: Mar. 23, 1999

[54] OPTICAL DISK DEVICE CAPABLE OF ACCESSING A PLURAL DIFFERENT TYPES OF OPTICAL DISKS

[75] Inventors: Tatsumaro Yamashita; Kenji Abe, both of Miyagi-ken, Japan

[73] Assignee: Alps Electric Co., Ltd., Tokyo, Japan

[21] Appl. No.: 925,097

[22] Filed: Sep. 8, 1997

[30] Foreign Application Priority Data

Sep. 25, 1996 [JP] Japan ................................ 8-252853

[51] Int. Cl.⁶ .............................. G11B 17/22; G11B 3/90
[52] U.S. Cl. ................................ 369/34; 369/58
[58] Field of Search ................... 369/34, 58, 36, 369/291, 75.2, 77.2, 77.1, 75.1; 360/133

[56] References Cited

U.S. PATENT DOCUMENTS

| | | | |
|---|---|---|---|
| 4,995,029 | 2/1991 | Kobayashi et al. | 369/291 |
| 5,091,901 | 2/1992 | Yamamoto et al. | 369/291 |
| 5,189,656 | 2/1993 | Masaki et al. | 369/47 |
| 5,289,451 | 2/1994 | Ashinuma et al. | 369/58 |
| 5,541,905 | 7/1996 | Adamaki | 369/58 |
| 5,548,571 | 8/1996 | Mistretta | 369/77.2 |
| 5,574,705 | 11/1996 | Suzuki | 369/36 |
| 5,633,842 | 5/1997 | Nishida et al. | 369/34 |

FOREIGN PATENT DOCUMENTS

| | | |
|---|---|---|
| 0 265 167A2 | 4/1988 | European Pat. Off. . |
| 0 717 405A2 | 6/1996 | European Pat. Off. . |
| WO 8601631 A | 3/1986 | WIPO . |

*Primary Examiner*—Tan Dinh
*Attorney, Agent, or Firm*—Brinks Hofer Gilson & Lione

[57] ABSTRACT

A plurality of trays (T) are set in a disk package loaded into a disk device, and different types of disks are rested on the trays (T). Identification means (30) giving information about the type of a disk is provided on a hook (T7) of each of the trays (7), and detecting means (32) for detecting the information given by the identification means (30) is provided on a drawing lever (18) for drawing out the tray. When the disk package is loaded into the disk device, the types of the disks on the trays (T) can be discriminated by moving and positioning the drawing lever (18) to face the hooks (T7) of the trays (T) successively.

3 Claims, 11 Drawing Sheets

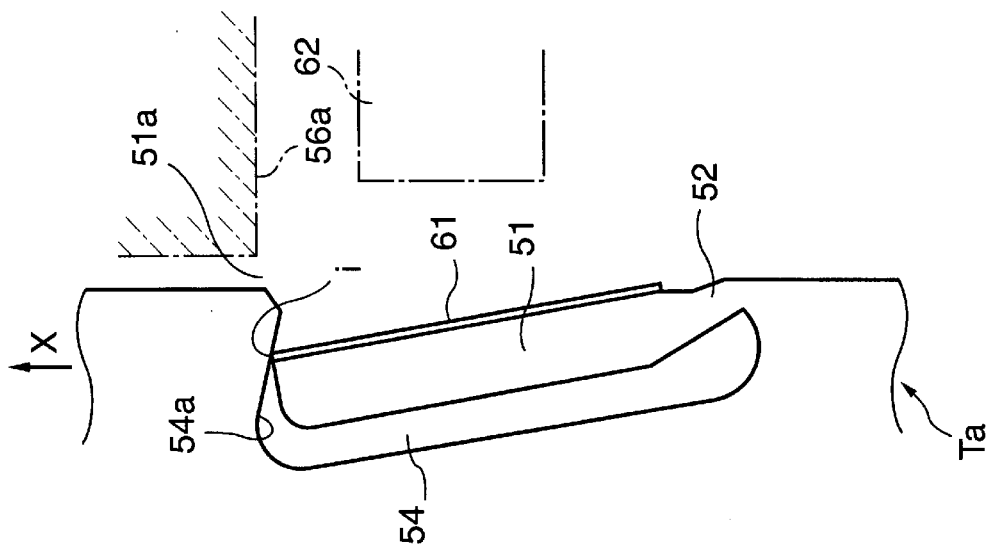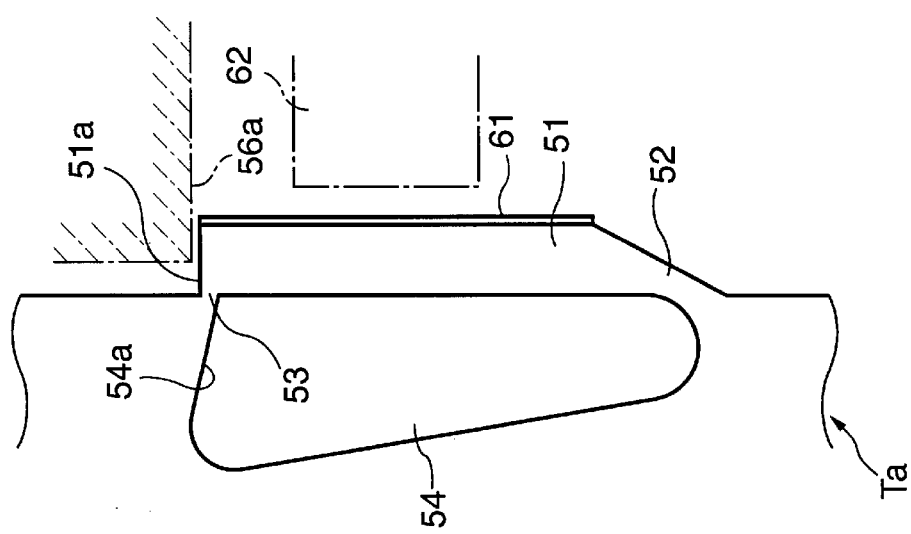

OPTICAL DISK DEVICE CAPABLE OF ACCESSING A PLURAL DIFFERENT TYPES OF OPTICAL DISKS

BACKGROUND OF THE INVENTION

1. Field of the Invention

The present invention relates to a disk device for use with personal computers, audio equipment, etc., into which is loaded a disk package accommodating different types of disks together, such as CD, CD-ROM, DVD and PD, and which selects one of the disks from the package and drives it when the package is loaded.

2. Description of the Related Art

There are proposed a variety of optical disk media. CD (Compact Disk) and CD-ROM (CD—Read Only Memory) are disks of pit modulation type, and CD-R (CD—Rewritable) is a disk capable of recording data once. PD (Power Disk) is a disk of phase changing type capable of recording/playback (reproduction), and MO (Magneto-Optical Memory) and HS (Hyper Storage) are disks of magneto-optical type capable of recording/playback. Further, as large-capacity disks used for audio, video and computer data, there are known DVD-ROM (Digital Versatile Disk—ROM) of pit modulation type and DVD-RAM (DVD—Random Access Memory) of phase changing type capable of recording/playback. MD (Mini Disk) is also known as a small disk of magneto-optical type capable of recording/playback which is used with audio equipment and computers.

Disk devices for driving such disks are grouped into two types. In one type, only one selected from various disks is loaded in the disk device. In the other type represented by a CD changer, for example, a plurality of disks of the same type are loaded in the disk device and one of those disks is selected and driven for playback.

Recently, there have also been proposed disk devices which include disk driving means capable of driving both CD and DVD and are adaptable for loading of both CD and DVD.

For disk devices adaptable for different types of disks, however, most devices are designed to load CD or DVD one by one therein individually and devices permitting different types of disks to be loaded therein at the same time have not yet been proposed. In particular, disk devices adaptable for simultaneous loading of both a disk exclusive to playback and a recordable disk, such as represented by a combination of CD or CD-ROM and DVD-RAM or a combination of DVD-ROM and DVD-RAM, have not been conceived. Taking into account versatile utility of optical disk media in future, i.e., versatility of computer software and an increase in capacity of demanded data, there exists a need for a disk device which permits different types of disks to be loaded therein together.

In the conventional disk devices into which different types of disks, such as CD or DVD, are loaded separately, the type of the loaded disk is determined with an optical head by reading the TOC data of the disk, or detecting a difference in thickness from the cover surface to the recording surface of the disk, or detecting the track density. This gives rise to a problem that a long time is required for the device to, after loading of a disk, determine the type of the disk and come into the playback operation, etc.

Further, assuming a disk device into which both a disk exclusive to playback, e.g., DVD-ROM, and a recordable disk, e.g., DVD-RAM, can be loaded, a problem is expected to occur in that if an error takes place in determining the type of the loaded disk, the disk device may take DVD-ROM as DVD-RAM erroneously and apply laser power for recording to the DVD-ROM, thereby destroying the data recorded in the DVD-ROM.

SUMMARY OF THE INVENTION

An object of the present invention is to provide a disk device which can satisfy the above-mentioned needs in the art and which, when a disk package accommodating different types of disks in the same case is loaded, can detect the types and positions of the disks in the disk package and perform the playback operation, etc. adapted for each of the disks.

According to the present invention, in a disk device into which is loaded a disk package accommodating two or more different types of multiple disks in a case, the disk device comprises drawing means for selecting one of the disks in the disk package and drawing the selected disk out of the case, disk driving means for driving the drawn-out disk, and detecting means for accessing identification means provided on the disk package and detecting the types of the disks in the case.

The identification means is provided on the case, and the detecting means accesses the identification means from the outside of the case and detects the types of the disks in the case at the time or after the disk package is loaded into the disk device.

As an alternative, trays each receiving one of the multiple disks and capable of being drawn out of the case are set in the case of the disk package, the drawing means selects and draws one of the trays out of the case, and the identification means is provided on each of the trays.

Preferably, the drawing means and the detecting means for detecting the identification means provided on each of the trays are mounted on a selectively movable base moving in a direction in which the trays are arranged one above another in the case, and when the disk package is loaded into the disk device, the selectively movable base is moved in the direction of arrangement of the trays, causing the detecting means to successively access the identification means provided on each of the trays.

In addition, preferably, the identification means is provided on a hook formed on each of the trays, and the detecting means for accessing the identification means is provided on the drawing means for applying a drawing force to the hook.

The disk device of the present invention preferably includes not only the detecting means for accessing the identification means provided on the case of or each tray in the disk package and discriminating the types of the disks, but also another means for detecting the types of the disks. Another detecting means can be practiced with an optical head of the disk driving means by detecting the track pitch of the disk, or detecting the distance from the surface of a protective layer of the disk to the recording surface thereof, or reading the TOC data and detecting the disk types based on differences in the read data. By thus accessing the identification means provided on the case or the tray and utilizing the discrimination result detected by the optical head in a combined manner when the disk package is loaded into the disk device, the type of the disk drawn out of the case can be discriminated more reliably.

The disk package loaded into the disk device of the present invention comprises a case capable of being loaded into a device body, two or more different types of multiple disks accommodated in the case to be capable of being taken out of the case separately, and identification means capable of being accessed from the device body side to detect the types of the disks accommodated in the case.

The disk package is employed in a condition where at least two or more types of disks, such as CD and DVD-RAM, CD-ROM and DVD-RAM, etc., are accommodated in predetermined positions within the case. Preferably, the disk package is put on the market as a package in which those disks are already accommodated in the predetermined positions. Combinations of data of disks accommodated in one package include a combination of an operating system for computers and a plurality of application softwares, a combination of music data and video data, a combination of various game softwares, a combination of various data corresponding to an encyclopedia or the like, etc. More preferably, disks exclusive to playback (ROM disks) and recordable disks (RAM disks) are accommodated in the same package together. Such a package including ROM and RAM disks together can be used as a storage of private library type that is adaptable for both commercially available softwares and data or softwares treated, e.g., edited by users themselves.

Because the identification means enabling the types of the disks accommodated in the disk package to be discriminated is provided on the disk package side, it is possible to access the identification means from the device body side and to detect the types of the disks in the disk package or determine in which position a RAM disk is accommodated and in which position a ROM disk is accommodated, at the time the disk package is loaded into the disk device body.

The identification means is provided on the case, for example, and the detecting means provided on the device body side is arranged to be able to access the identification means from the outside of the case.

The identification means provided on the case can be practiced by forming identification holes of several bits in an outer surface of the package case and arranging mechanical switches, for example, on the device body side to detect whether the identification holes are opened or closed. Alternatively, a jumper card may be embedded in a portion of the package case where the identification holes are formed so that the presence or absence of the identification holes may be electrically detected. As another alternative, an IC card may be embedded in the case so that data recorded in the IC card may be read from the device body side. Where an IC card is embedded in the case, information relating to not only the types of the disks, but also data similar to the TOC data, such as the contents or lists of data recorded in the disks, can be held on the disk package side.

From the structural point of view, the disk package is made up of the case capable of being loaded into the device body, and a plurality of trays each receiving one of two or more different types of multiple disks and set in the case to be capable of being drawn out of the case separately. The trays are colored in different colors depending on the types of the disks.

In the disk package wherein disks are rested on the trays and drawn out of the case together with the trays, the types of the disks resting on the trays can be discriminated by coloring the trays in different colors. Particularly, by coloring the trays receiving RAM disks and the trays receiving ROM disks in different colors and forming a window in the case, for example, so that the tray colors can be viewed from the outside of the case, users can easily recognize at a glance in which positions RAM disks are accommodated. If standards are defined for the disk package and the device body with regard to in which stages of the disk package accommodating multiple disks therein RAM disks are to be located, users can visually judge from the tray color whether the trays receiving RAM disks are accommodated in the positions as defined by the standards. The use of disk packages according to false standards can be thus prevented.

In another form of the disk package, the package comprises a case capable of being loaded into the device body, a plurality of trays each receiving one of two or more different types of multiple disks and set in the case to be capable of being drawn out of the case separately, and identification means provided on each of the trays to be capable of being accessed from the device body side to detect the type of the disk resting on the tray.

The identification means provided on each of the trays can be practiced, for example, by providing identification lugs in part of the tray which is drawn out of the case, and detecting the presence or absence of the identification lugs with mechanical switches. Where the trays are colored in different colors, the types of the disks can be recognized by discriminating the tray colors with color sensors. Alternatively, an optical or magnetic detecting portion for giving information of 1 to 3 or more bits may be provided on each of the trays. As another alternative, resistors may be provided on the trays such that resistance values of the resistors are different from tray to tray.

The disk package containing the trays in the case which are colored in different colors or provided with individual identification means, as mentioned above, is used or put on the market in a condition where two or more types of disks are rested on the respective trays. In some situations, however, the disk package including only the trays fitted in the case is put on the market and users set disks on the corresponding trays by themselves.

BRIEF DESCRIPTION OF THE DRAWINGS

FIGS. 6A and 6B show identification means provided on a case of the disk package and detecting means for accessing the discriminating means in which; FIG. 6A is an enlarged sectional view taken along line VIA—VIA in FIG. 5 and FIG. 6B is an equivalent circuit diagram.

FIGS. 7A and 7B show identification means provided on each of trays in the disk package and detecting means for accessing the identification means in which; FIG. 7A is a partial perspective view and FIG. 7B is a partial plan view.

FIGS. 11A and 11B are partial enlarged plan views showing the position relationship in different states between the second lock mechanism and the tray on which a RAM disk is rested.

DESCRIPTION OF THE PREFERRED EMBODIMENT

Figure 1:
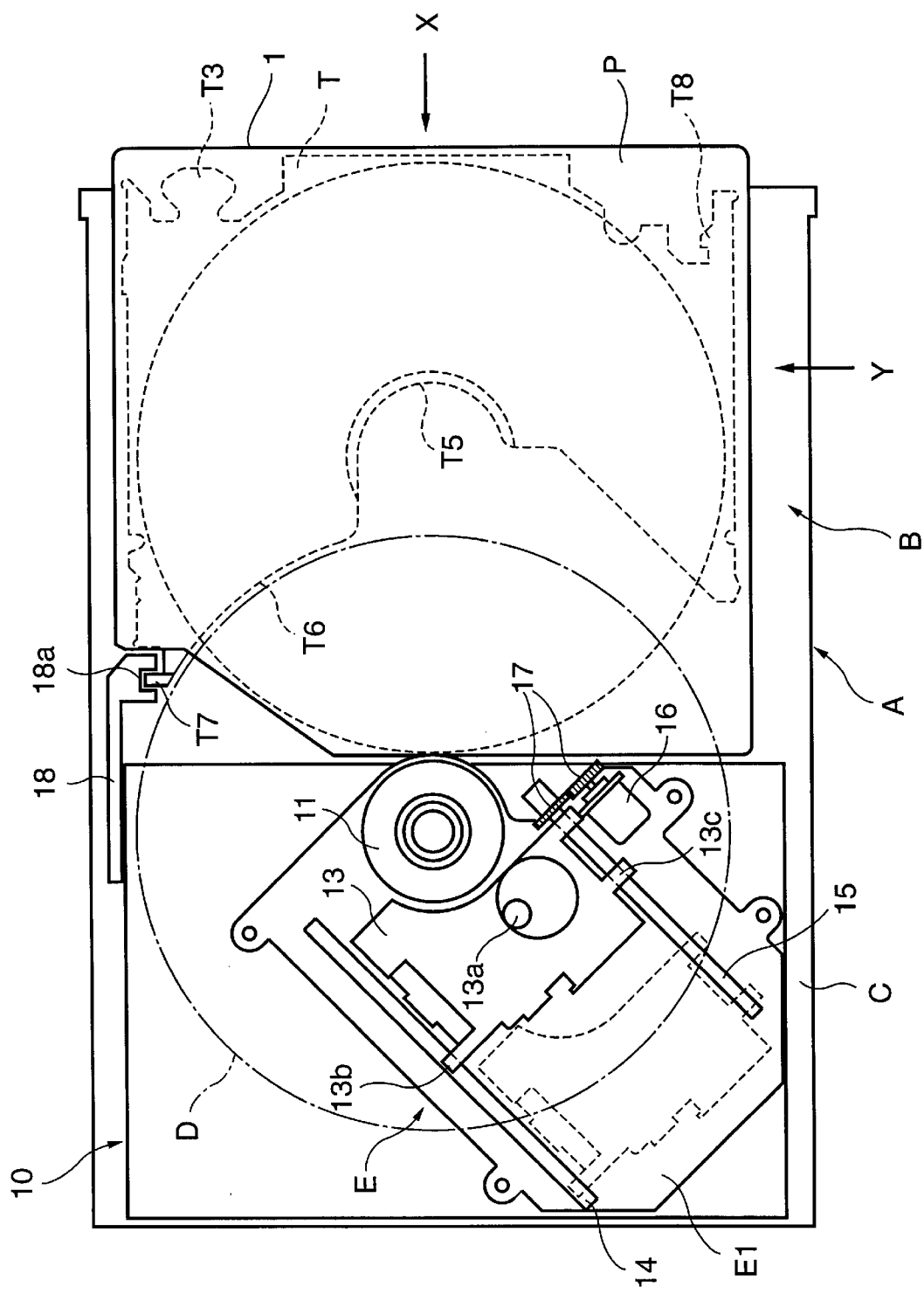
FIG. 1 is a horizontal sectional view of a disk device of the present invention.
Figure 2:
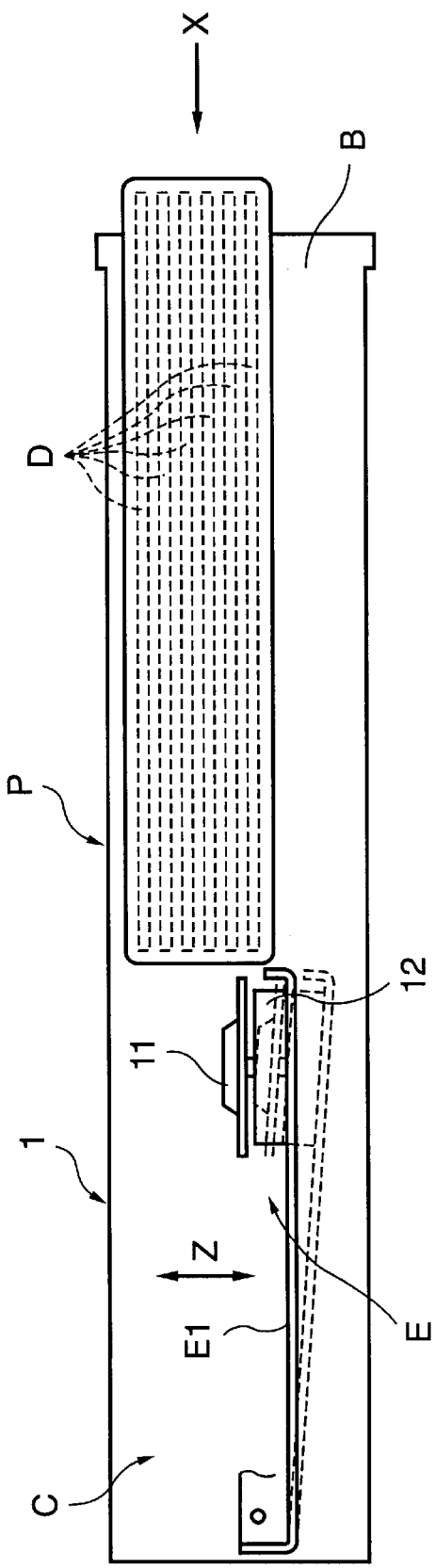
FIG. 2 is a vertical sectional view of the disk device shown in FIG. 1.
Figure 3:
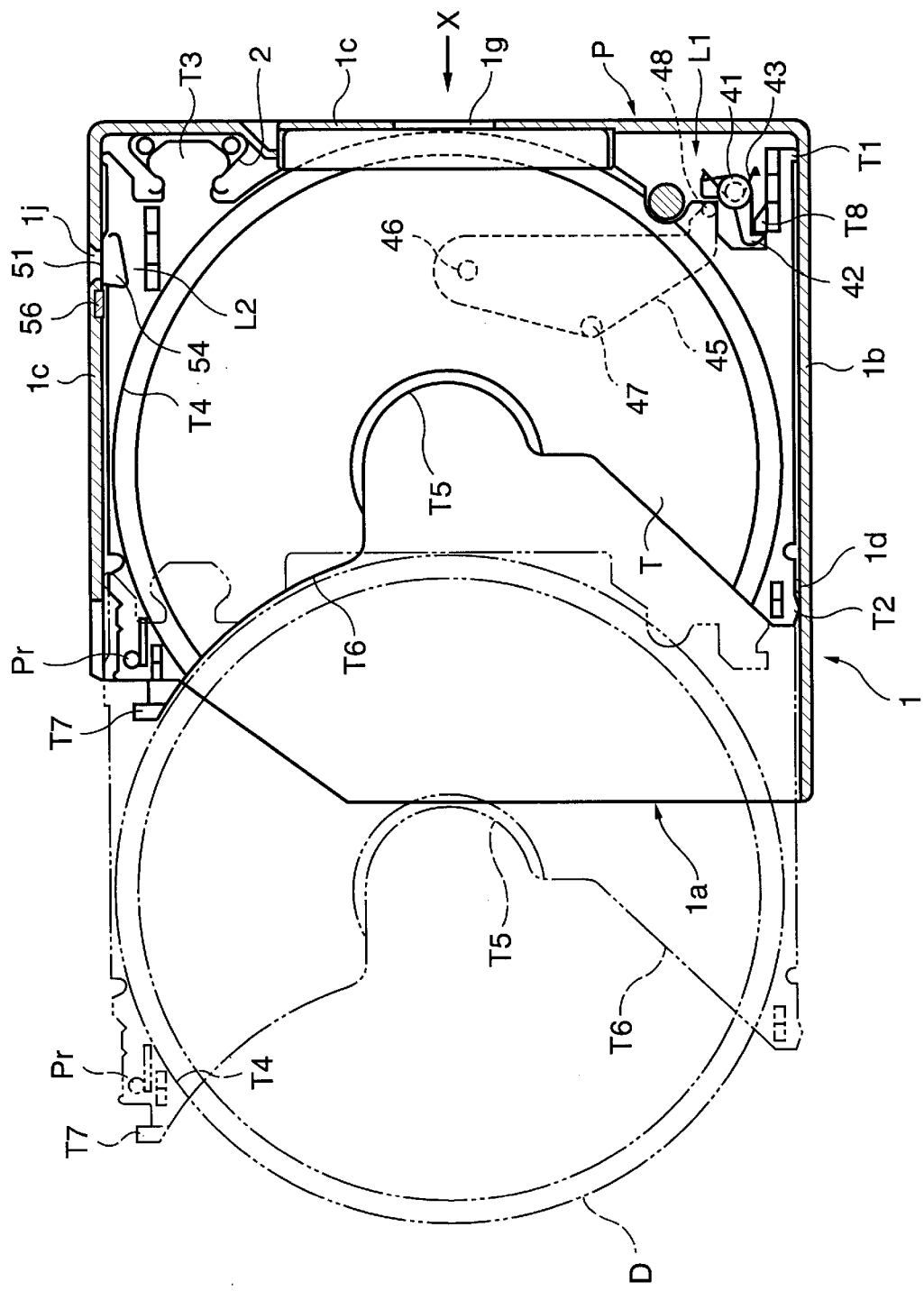
FIG. 3 is a horizontal sectional view of a disk package loaded into the disk device.
Figure 4:
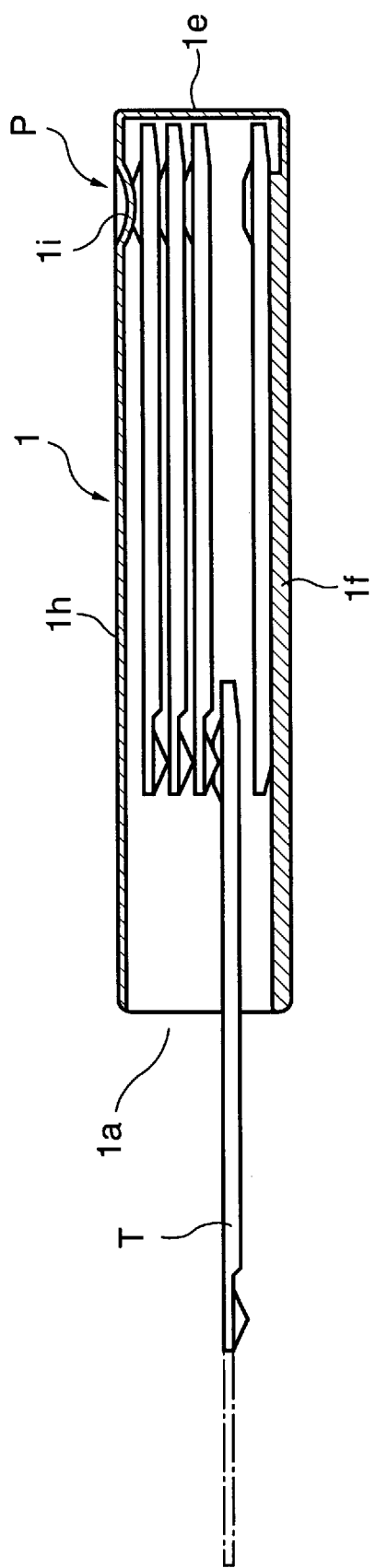
FIG. 4 is a vertical sectional view of the disk package shown in FIG. 3.
Figure 5:
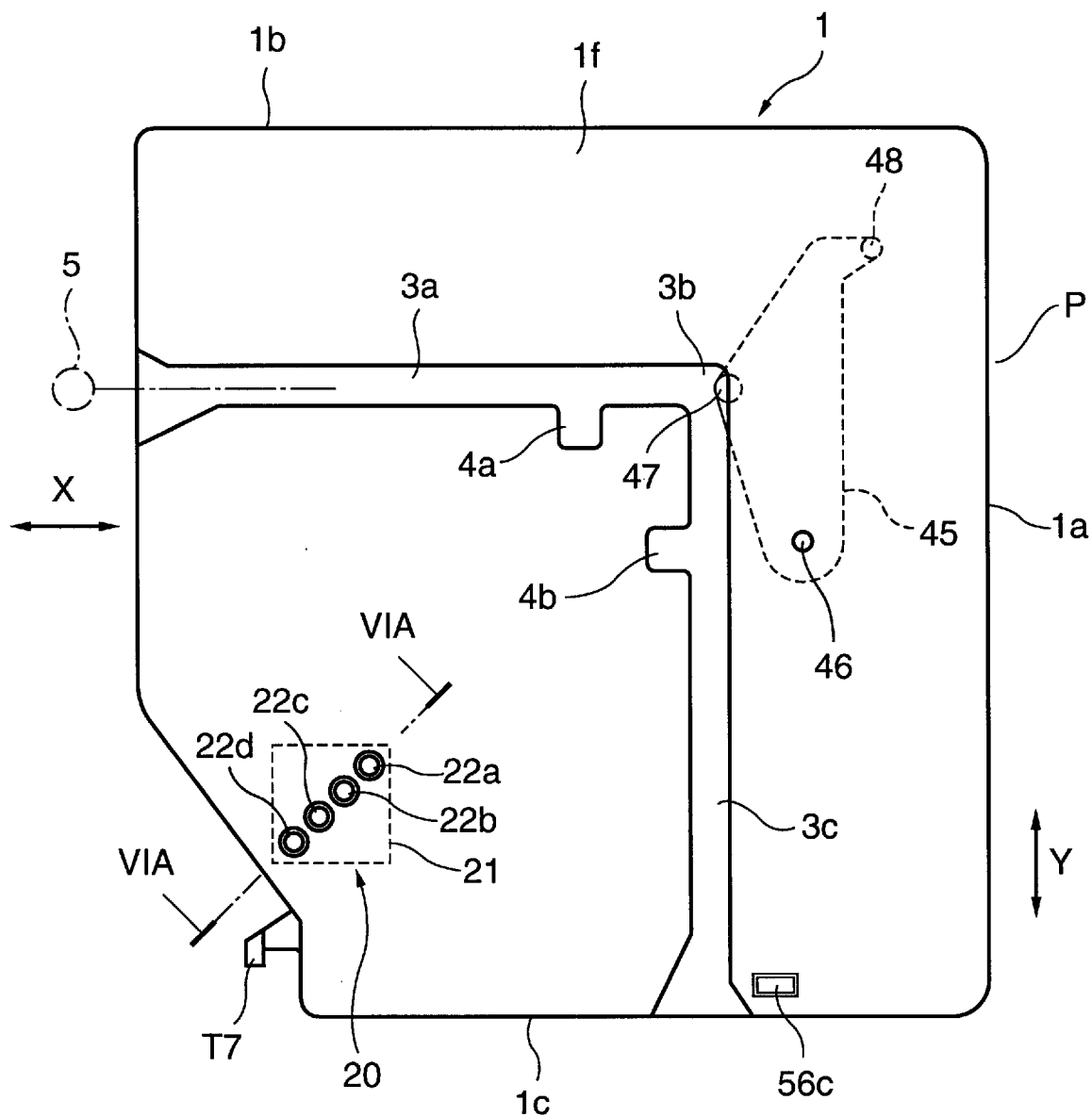
FIG. 5 is a bottom view of the disk package.

FIG. 1 is a horizontal sectional view showing one example of a disk device into which a disk package is loaded, FIG. 2 is a vertical sectional view of the disk device shown in FIG. 1, FIG. 3 is a horizontal sectional view of the disk package, FIG. 4 is a vertical sectional view of the disk package shown in FIG. 3, and FIG. 5 is a bottom view of the disk package. Further, FIG. 6 and subsequent figures show details of the disk package and the disk device individually.

Summary of Disk Package

A disk device shown in FIGS. 1 and 2 has a housing A which is rectangular in plan view. An inner space of the housing A is divided into an area B for loading of a disk package P and a disk driving area C. In the disk driving area C, there is provided disk driving means E for driving a disk D drawn out of the disk package P.

The disk package P is loaded into the housing A of the disk device through a longitudinal end side of the rectangle in a direction X shown in FIGS. 1 and 2.

The disk package P is able to accommodate disks with a diameter of 12 cm and disks with a diameter of 8 cm in plural number. Also, the disk package P accommodates both ROM disks exclusive to playback and recordable RAM disks together. The ROM disks include CD, DVD-ROM, etc. and the RAM disks include PD, DVD-RAM, etc. The disks with a diameter of 8 cm include a single CD, etc.

The disk package P has a case 1 made of a synthetic resin. The case 1 has an opening 1a formed on the left side thereof, as shown in FIGS. 3 and 4, the opening 1a serving as a port through which a tray T and the disk D is drawn out.

A plurality of trays T are set inside the case 1 in a drawable manner. In the illustrated embodiment, five trays T can be set inside the case 1. A plurality of horizontal ribs (not shown) are projected on each inner surface of a left side plate 1b and a right side plate 1c of the case 1. The trays T are each slidable in the direction X while both left and right lateral edges of the tray T are guided by and between the horizontal ribs. As shown in FIG. 3, the tray T is provided on one of the lateral edges (the lateral edge on the lower side in the figure) with a restricting projection T1 at its right end in the figure and a restricting projection T2 at its left end in the figure. Also, a stop projection 1d is integrally formed on an inner surface of the left side plate 1b of the case 1 in a position between both the restricting projections T1 and T2. Further, each of the trays T has a retaining projection T3 integrally protruded on its right end side in the figure, whereas the case 1 has pairs of leaf springs 2 provided on an inner surface of a front plate 1e on the right side in the figure for retaining the retaining projections T3 of the trays T.

In the state of each tray T being set inside the case 1, as indicated by solid lines in FIG. 3, the retaining projection T3 of the tray T is retained by the pair of leaf springs 2 so that the tray T is kept from springing out through the opening 1a and prevented from wobbling. If the tray T is pulled through the opening 1a to the left in the figure, the retaining projection T3 is dislodged from the pair of leaf springs 2, allowing the tray T to be drawn out of the opening 1a. When the tray T is drawn out by a predetermined distance, the restricting projection T1 formed on the side edge of the tray T strikes against the stop projection 1d of the case 1. This results in a position of the tray T where it is maximally drawn out.

FIG. 3 shows a state, by chain lines, where the tray T is maximally drawn out of the case 1, and FIG. 4 shows a state where the tray T in the fourth stage counted from the top is drawn out of the case 1. If the tray T is further forcibly drawn out of the case 1 from the above maximally-drawn-out state, a portion of the tray T where the restricting projection T1 is formed is elastically deformed to such an extent that the restricting projection T1 can ride over the stop projection 1d, allowing the tray T to be removed out of the case 1.

A recessed portion T4 capable of receiving a disk with a diameter of 12 cm is formed on an upper surface of each tray T shown in FIG. 3, and a semicircular hole T5 is formed to penetrate the center of the recessed portion T4 so that a center hole of the disk D can be exposed downward to the outside of the tray through the semicircular hole T5. Further, an arcuate cutout portion T6 joining continuously with the semicircular hole T5 is formed in part of the tray T on the left side in the figure. When the tray T is drawn out to the position indicated by the chain lines in FIG. 3, a circumferential edge of the disk D resting in the recessed portion T4 of the drawn-out tray T is positioned outwardly of the cutout portion T6 of another tray T just above the drawn-out tray T. In the state where the tray T is drawn out to the position indicated by the chain lines in FIG. 3, therefore, when the disk D on the drawn-out tray T is slightly lifted from the tray surface and driven for rotation, the disk D will never interfere with another tray T just above the drawn-out tray T. Thus, in this embodiment, the tray T is drawn out to a position at which the center hole of the disk D locates outwardly of the case 1, and the disk D on the tray T can be driven for rotation in such a state that part of the disk D is positioned in the case 1.

When a small-diameter disk with a diameter of 8 cm is employed, a tray T dedicated to the small-diameter disk is set in one of the stages within the case 1. This tray has the same structure as the tray for a disk with a diameter of 12 cm except that a recessed portion T4 formed in its upper surface is sized corresponding to the disk with a diameter of 8 cm.

Further, a hook T7 is provided on one side of the tray T at a left end in the figure for applying a force from the device body to the tray T to draw out it.

As shown in FIG. 5, a guide groove 3a extending in the direction X is formed in a bottom plate 1f of the case 1 of the disk package P. A guide projection 5 is provided on an inner bottom of the disk device in the loading area B, shown in FIGS. 1 and 2, such that the guide groove 3a is slidably fitted to the guide projection 5 with no appreciable gaps left therebetween. When the disk package P is inserted into the loading area B in the direction X, the guide groove 3a formed in the bottom plate 1f fits to the guide projection 5 and slides along the guide projection 5. Then, at the time an end 3b of the guide groove 3a extending in the direction X comes into abutment against the guide projection 5, the operation of inserting and loading the disk package P is completed. At this time, a lock member (not shown) provided on the housing A in the loading area B fits to a lock slot 4a formed midway the guide groove 3a, whereupon the disk package P is locked in place.

While the disk device shown in FIG. 1 is illustrated as receiving the disk package P loaded in the direction X, the disk device may be constructed such that the disk package P is loaded in a direction Y. The disk package P can also be used in such a case. Specifically, as shown in FIG. 5, a guide groove 3c extending in the direction Y is formed in the bottom plate 1f of the case 1, and a lock slot 4b is formed midway the guide groove 3c. When the disk package P is loaded in the direction Y, the guide groove 3c extending in the direction Y slides along the guide projection 5 provided in the loading area B.

Structure of Disk Device A selectively movable base 10 is provided inside the housing A of the disk device in the disk driving area C shown in FIGS. 1 and 2. A lifting/lowering drive mechanism is also provided in the housing A and generates driving forces for moving the selectively movable base 10 up and down in a direction in which the trays T are arranged one above another (i.e., in a direction Z). By controlling a vertical position of the selectively movable base 10 moving in the direction Z, one of the trays T in the disk package P loaded into the disk device is selected.

The aforesaid disk driving means E is mounted on the selectively movable base 10. The disk driving means E has a driving base E1 on which are mounted a turntable 11 for holding the disk D at the center hole thereof and a spindle motor 12 for driving the turntable 11 to rotate about the center. The disk driving means E also includes a guide shaft 14 extending in one radial direction of the disk D, and a driving screw shaft 15 extending parallel to the guide shaft 14. An optical head 13 has a bearing portion 13b slidably supported by the guide shaft 14, and a female threaded portion 13c held in mesh with the driving screw shaft 15. The optical head 13 contains a light emitting device such as a laser diode, a light receiving device for detecting light reflected from the disk, and an optical element such as a beam splitter. An objective lens 13a of the optical head 13 is disposed to face the recording surface of the disk D.

The optical head 13 is capable of reading different types of disks D, e.g., CD and DVD. For example, the objective lens 13a is arranged such that two pieces of lenses having different focal lengths can be switched over to selectively serve as the objective lens.

The disk driving means E includes a sled motor 16 which is mounted on the driving base E1 and produces power transmitted to the driving screw shaft 15 through a gear group 17. A resulting torque of the driving screw shaft 15 causes the optical head 13 to move in the radial direction of the disk D.

While the disk device shown in FIG. 1 is exclusively used for playback, a disk device intended to recording as well includes disk driving means E capable of recording is provided. In the case of employing a recordable disk D of magneto-optical recording type, for example, a magnetic head is positioned above the objective lens 13a with the disk D between them.

The selectively movable base 10 mounting the disk driving means E thereon is movable up and down to select one of the trays T in the disk package P depending on the vertical position to which it has moved. Further, in the state where the selectively movable base 10 is stopped in front of the selected tray T, the driving base E1 on the selectively movable base 10 is rotatable between a horizontal posture indicated by solid lines in FIG. 2 and a posture extending obliquely downward as indicated by broken lines. In FIG. 2, the selectively movable base 10 is stopped at the position allowing the tray T in the second stage counted from the bottom to be selected, and the driving base E1 is first inclined to the broken-line posture before the tray T is drawn out. After the tray T is drawn out, the driving base E1 is returned to the horizontal posture and the turntable 11 is fitted to the center hole of the disk D. At this time, the disk D is slightly elevated from the tray T and clamped between the turntable 11 and a clamp member (not shown) for rotation.

As shown in FIG. 1, a drawing lever 18 is provided as drawing means laterally of the selectively movable base 10. The drawing lever 18 is moved up and down in the direction Z together with the selectively movable base 10 and is driven by a drawing drive mechanism mounted on the selectively movable base 10 to move to the left in the figure.

When the selectively movable base 10 is moved to the lowermost position in the housing A, the drawing lever 18 is disengaged from the hooks T7 of all the trays. But when the selectively movable base 10 is elevated to the position for selecting any one tray T, a recess 18a formed in the drawing lever 18 is positioned to be engageable with the hook T7 of the selected tray T. In FIG. 2, for example, the selectively movable base 10 is moved and stopped in the position allowing the tray T in the second stage counted from the bottom to be selected, and at this time, the recess 18a of the drawing lever 18 is also moved to locate in the position where it is engageable with the hook T7 of the selected tray T in the second stage counted from the bottom. When the drawing lever 18 is driven in the above state to move to the left in the figure, the selected tray T is drawn out by the drawing lever 18 into the disk driving means E.

Disk Type Identification Means

At least two or more different types of disks are received in the disk package P, and identification means enabling the types of the disks to be discriminated is provided on the side of the disk package P.

The trays T are each formed of a synthetic resin material and colored entirely in different colors depending on the types of the disks to be rested thereon. For example, the tray T on which CD is to be rested is colored in gray, the tray T on which DVD-ROM is to be rested is colored in blue, the tray T on which PD is to be rested is colored in red, and the tray T on which DVD-RAM is to be rested is colored in green. This assortment by color enables users to not only visually discern whether the disk is of RAM type or ROM type, but also visually discern a difference in recording mode between the disks. Alternatively, the disks may be colored in only two colors to discriminate the trays on which RAM disks are to be rested and the trays on which ROM disks are to be rested.

In the disk package P shown in FIG. 3, the colors of the trays T can be visually recognized from the side of the opening 1a of the case 1. Also, a window 1g is opened in a wall of the case 1 on the right side in the figure, i.e., in the front plate 1e which can be viewed from the front of the disk device when the disk package is loaded in the disk device. A transparent panel is fitted to the window 1g. Accordingly, users can visually confirm the colors of the trays T within the case 1 by looking at the window 1g formed in the front plate 1e from the front side in the state where the disk package P is loaded in the disk device.

Further, as shown in FIG. 5, identification means 20 representing the types of disks received in the disk package P is provided in the bottom plate 1f of the case 1 of the disk package P.

Figure 6A:
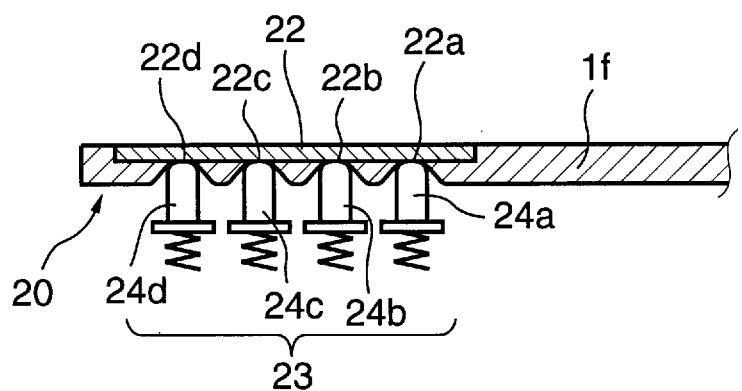
Figure 6B:
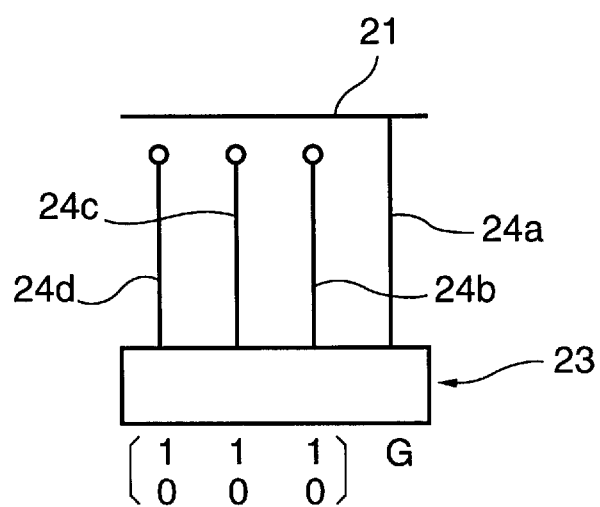

FIG. 6A is an enlarged sectional view, taken along line VIA—VIA in FIG. 5, showing the identification means 20 and FIG. 6B is an equivalent circuit diagram.

The identification means 20 comprises a jumper card 21 embedded in a thick wall portion of the bottom plate 1f of the case 1, and four identification holes 22a, 22b, 22c, 22d opened or closed to allow or cut off connection with the jumper card 21. Detecting means 23 for accessing the identification means 20 is provided in the loading area B of the housing A of the device body. The detecting means 23 includes four detecting pins 24a, 24b, 24c, 24d corresponding to the identification holes 22a, 22b, 22c, 22d, respectively. When the disk package P is loaded into the loading area B, the detecting pins 24a, 24b, 24c, 24d are urged by spring forces toward the corresponding identification holes 22a, 22b, 22c, 22d of the case 1.

One 24a of the detecting pins serves as a ground pin (i.e., a pin kept at the ground potential). The types of disks can be identified depending on whether the detecting pin 24a is electrically connected to which one or more of the other detecting pins 24b, 24c, 24d. Specifically, the detecting pin 24a serving as a ground pin is always moved into the identification hole 22a to contact the jumper card 21. The other identification holes 22b, 22c, 22d are opened or closed depending on the information to be transmitted. For example, if the identification hole 22b is opened, the detecting pin 24b contacts the jumper card 21 and the detecting pins 24a and 24b are electrically connected. Assuming that the above state is represented by "1", if the identification hole 22b is closed, the detecting pins 24a and 24b are not electrically connected, resulting in a state of "0". Since there are total three identification holes except the identification hole serving as a ground pin, identification information of 3 bits (eight different data) can be provided by the detecting means 23 for accessing the identification means 20 from the side of the housing A (i.e., the device body side).

Based on the above identification information of 3 bits, it is possible on the device body side to recognize, e.g., that the disk D received in which one of the stages in the disk package P is a RAM disk, and the disk D received in which one of the stages different from the above is a ROM disk. It is also possible on the device body side to recognize combinations of the types of five disks. Furthermore, by increasing the number of the identification holes, more data of identification information can be obtained on the device body side.

The identification means 20 giving the identification information of several bits is not limited to the above-explained means using the jumper card 21, but may be constructed, by way of example, as follows. A plurality of reflecting sheets are provided on an outer surface of the case 1, and photo-reflectors for applying light to reflecting surfaces of the reflecting sheets and detecting light reflected therefrom are provided on the device body. Identification information of disks in the disk package P can be obtained depending on whether the reflecting sheets are present or absent, i.e., whether light is reflected or not at identification positions of predetermined bits.

Alternatively, the identification means 20 may be constructed by embedding a storage element, e.g., an IC card, in the case 1 and providing a contact terminal on the side of the housing A for access to the IC card or the like. By using an IC card or the like, a quantity of information that can be held on the side of the case 1 is so increased that not only the information about the types of disks received in the case 1, but also the contents of information recorded in the disks and other additional information such as the TOC data or other similar data can be obtained on the device body side.

Figure 7A:
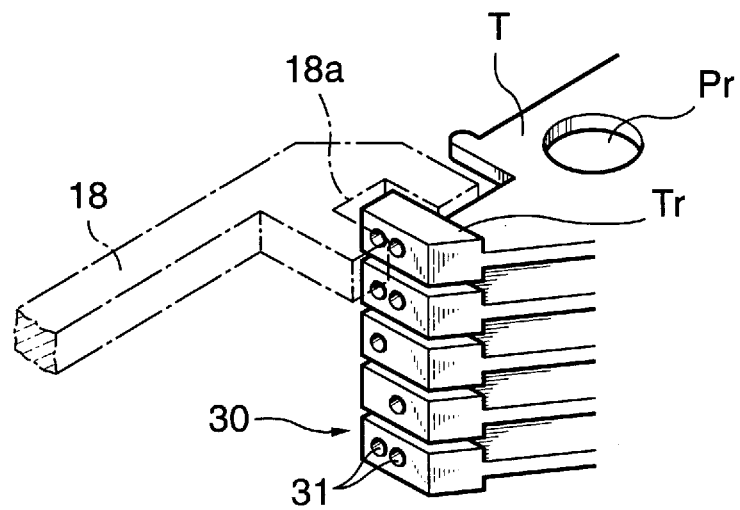
Figure 7B:
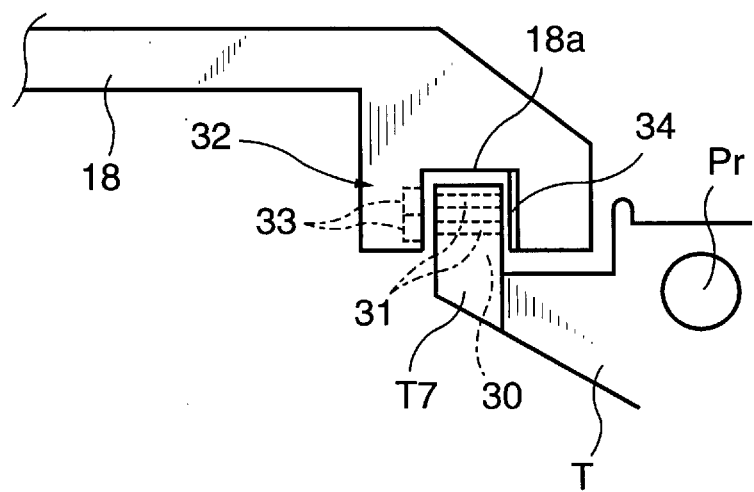

In an example of FIG. 7, identification means 30 is provided on each of the individual trays T fitted in the case 1. FIG. 7A is a perspective view showing the identification means provided on the individual trays T and detecting means provided on the device body side, and FIG. 7B is a plan view.

The identification means 30 is provided in a portion of the hook T7 of each of the trays T. The identification means 30 includes identification holes 31 of 2 bits formed in the hole T7 of each tray T. Also, detecting means 32 on the device body side is provided on the drawing lever 18 attached to the selectively movable base 10. The detecting means 32 is made up of two photo-reflectors 33 embedded in an inner surface of one of two projections facing each other with a recess 18a therebetween, and a reflecting sheet (reflecting surface) 34 provided on an inner surface of the other projection. The identification holes 31 are each opened or closed to provide identification information. If the identification hole 31 is opened, detection light emitted from the photo-reflector 33 passes through the identification hole 31 and is reflected by the reflecting sheet 34 and then detected by the photo-reflector 33. In other words, information of "1" and "0" can be obtained depending on whether the identification hole 31 is opened or not. In the illustrated example, because two identification holes 31 are formed in each tray T7, one tray T can provide information of 2 bits. Based on the information of 2 bits, it is possible to discriminate the type of a disk resting on the tray T, e.g., whether the disk resting on the tray T is a ROM disk or a RAM disk, and the recording mode which is employed in the disk.

In the example shown in FIG. 7, the detecting means 32 for accessing the identification means 30 from the device body side is provided on the drawing lever 18, and the drawing lever 18 is movable in the direction Z shown in FIG. 2 together with the selectively movable base 10. Accordingly, immediately after the disk package P is loaded into the housing A, the selectively movable base 10 can be moved in the direction Z so that the detecting means 32 provided on the drawing lever 18 is positioned to face the identification means 30 provided on each of the trays T successively. On the side of the device body, means capable of detecting the position of the selectively movable base 10 in its vertical movement is provided to make it possible to recognize at which one of the trays T the detecting means 32 faces the identification means 30. Based on the above recognition and the information of 2 bits detected by the detecting means 32, identification information of the individual disks in the disk package P can be obtained on the device body side immediately after loading of the disk package P.

The identification means 30 provided on each tray T is not limited to the above-explained means of detecting the presence or absence of the identification holes 31, but may be constructed, by way of example, as follows. A reflecting-sheet attaching portion is provided in any suitable position of the tray T, and photo-reflectors are provided on the selectively movable base 10 to be able to face reflecting sheets attached in place. Identification information of disks is obtained by detecting whether the reflecting sheet is attached to the tray T or not. As an alternative, identification information of disks may be produced upon switches, which are provided on the selectively movable base 10, detecting the presence or absence of identification lugs provided on the tray T.

Note that for the identification means 20 provided on the case 1, shown in FIG. 5, and the identification means 30 provided on each of the trays T, it is possible to provide only one of them or utilize both of them in a combined manner.

Also, the identification means 20 provided on the case 1 and/or the identification means 30 provided on the tray T may be used in combination with the identification information of disks obtained by reading the TOC data of each disk D by the optical head 13 or detecting the track pitch thereof. By utilizing, in a combined manner, the identification information of disks obtained from the case and/or the tray and the identification information of disks obtained by the optical head 13 directly accessing the disks, accuracy in recognizing the types of the disks can be increased. This contributes to preventing a trouble of destroying the recorded information that would be resulted, for example, if a ROM disk is discriminated as a RAM disk erroneously and laser power for recording is applied to the recording surface of the ROM disk.

Furthermore, as shown in FIG. 3, a write protecting portion Pr is provided in part of the tray T inwardly of the hook T7. The write protecting portion Pr is provided for only the tray on which a RAM disk is to be rested, by forming that part of the tray to have a thin wall. For a disk device capable of recording operation, when the tray T is drawn out by the disk driving means E to a drivable position, a detecting portion is positioned to face the write protecting portion Pr. The detecting portion is made up of a light emitting device positioned to face one side of the write protecting portion Pr and a light receiving device positioned to face the other side thereof. If the write protecting portion Pr remains in the form of a thin wall, light emitted from the light emitting device is cut off by the write protecting portion Pr and the light receiving device does not detect the light. A RAM disk is thus judged as being writable. If a hole is opened in the write protecting portion Pr by breaking through the thin wall, the detection light passes through the hole, leading to a judgment that the recording operation cannot be performed on the disk even though it is a RAM disk.

In this way, whether a disk on the tray is recordable or not can be recognized based on the information obtained from the tray on which the disk is rested.

Lock Mechanism of Disk Package

The illustrated disk package P is provided with a first lock mechanism L1 for preventing all the trays T from projecting out accidentally in the state where the disk package P is taken out of the disk device, and a second lock mechanism L2 for preventing dislodgement of only the trays T, on which RAM disks are rested, in the state where all the trays are not locked by the first lock mechanism L1. By preventing dislodgement of the trays on which RAM disks are rested, in particular, the RAM disks can be prevented from being drawn out accidentally and contaminated or damaged in their recording surfaces in the state where the disk package P is taken out of the disk device.

Figure 8:
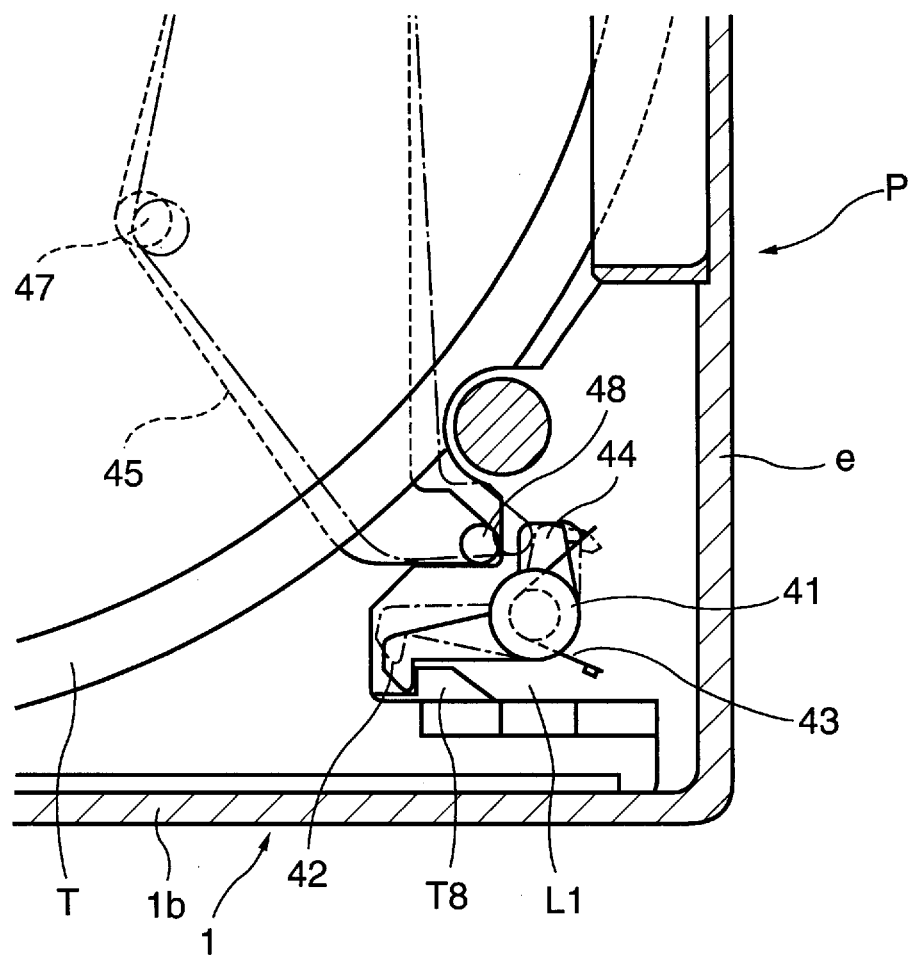
FIG. 8 is a partial horizontal sectional view showing a first lock mechanism provided on the disk package.
Figure 9:
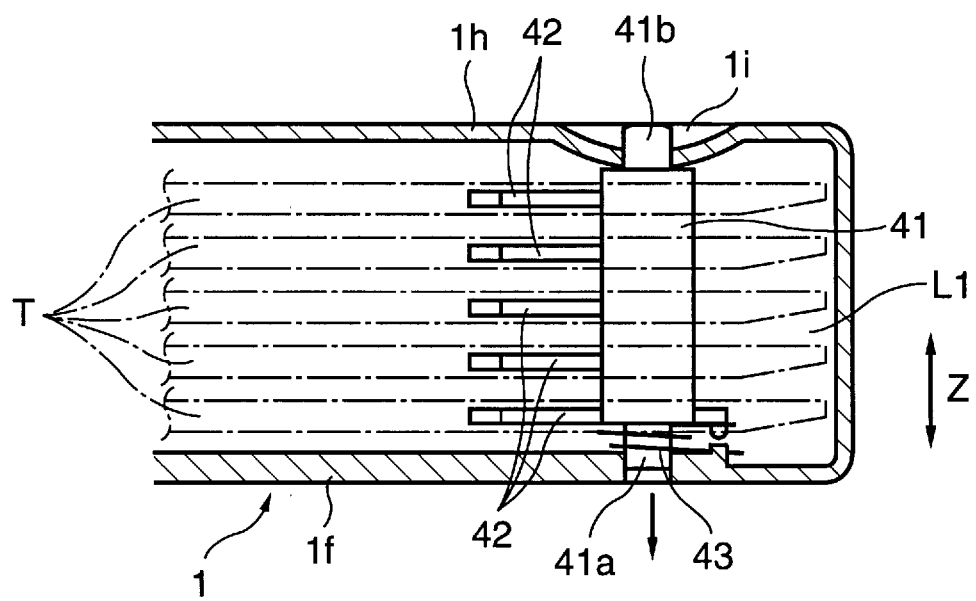
FIG. 9 is a vertical sectional view of FIG. 8.

FIG. 8 is a partial horizontal sectional view of the disk package P, showing the first lock mechanism L1, and FIG. 9 is a vertical sectional view of the same part as shown in FIG. 8.

A lock shaft 41 is provided in the case 1 of the disk package P. A small-diameter shaft 41a integrally formed at a lower end of the lock shaft 41 is inserted in the bottom plate 1f of the case 1, and a small-diameter shaft 41b integrally formed at an upper end of the lock shaft 41 is inserted through a recessed portion 1i formed in a top plate 1h of the case 1. Consequently, the lock shaft 41 is supported to be rotatable about its axis and slidable downward in the direction Z from the position shown in FIG. 9. A torsional coil spring 43 is fitted over an outer circumference of the small-diameter shaft 41a at the lower end, as shown in FIG. 9. Resilient forces of the torsional coil spring 43 urge the lock shaft 41 to not only rotate counterclockwise in the horizontal sectional view of FIG. 8, but also to move upward in FIG. 9. As a result, the small-diameter shaft 41b formed at the upper end of the lock shaft 41 projects outward through the recessed portion 1i of the top plate 1h of the case 1 so that it can serve as an unlock-actuating member.

Five lock pawls (lock members) 42 are integrally formed on the lock shaft 41 with certain intervals therebetween. On the other hand, a latch projection T8 cooperating with the lock pawl 42 is integrally formed on each of all the trays T set in the case 1. The lock shaft 41 also has a pressed projection 44 integrally formed thereon to protrude toward the interior of the case 1.

As shown in FIGS. 3 and 8, an unlock lever 45 is provided inside the case 1 in an inner area of the bottom plate 1f. The unlock lever 45 is rotatably supported by a support pin 46 provided on an inner surface of the bottom plate 1f. Further, the unlock lever 45 is urged by a spring member (not shown) to rotate clockwise in FIGS. 3 and 8. A pressing portion 48 is provided at one end of the unlock lever 45 and positioned to face the pressed projection 44 provided on the lock shaft 41.

A projection 47 is integrally formed on the unlock lever 45 in its intermediate portion. As shown in FIG. 5, the projection 47 slightly protrudes into the guide groove 3a extending in the direction X and the guide groove 3c extending in the direction Y, which are formed in the bottom plate 1f of the case 1, at the end 3b common to both the guide grooves 3a, 3c.

In the state where the disk package P is not loaded in the disk device, the lock shaft 41 is urged by the torsional coil spring 43 to move upward in the direction Z, as shown in FIG. 9, and to rotate counterclockwise, as shown in FIG. 8. In this state, the lock pawls 42 integrally extending from the lock shaft 41 are held in engagement with the latch projections T8 provided on all the trays T in the case 1 so that all the trays T are locked and prevented from projecting out of the case 1.

When the disk package P is inserted into the loading area B of the housing A in the direction X, the guide groove 3a, shown in FIG. 5, slides along the guide projection 5 provided in the housing A. Then, at the time the disk package P is completely inserted into the loading area B and the case 1 is locked upon the lock mechanism (not shown) engaging in the lock slot 4a, the guide projection 5 reaches the end 3b of the guide groove 3a and presses the projection 47. In the alternative case where the disk package P is loaded into the disk device in the direction Y, the projection 47 is also likewise pressed by the guide projection 5 having reached the end 3b of the guide groove 3c.

When the guide projection 5 presses the projection 47, the unlock lever 45 is rotated counterclockwise in FIGS. 3 and 8 (clockwise in the bottom view of FIG. 5). At this time, the pressing portion 48 integrally provided at one end of the unlock lever 45 presses the pressed projection 44, whereupon the lock shaft 41 is rotated clockwise in FIG. 8, causing the lock pawls 42 to disengage from the corresponding latch projections T8 on the trays T.

In other words, when the disk package P is taken out and left outside the disk device, all the trays T are held in a locked state by the lock pawls 42 and prevented from springing out of the case 1 accidentally. Also, at the time the disk package P is completely loaded into the loading area B of the housing A, all the trays T are released from the locked state established by the first lock mechanism L1.

Further, in the state of the disk package P being taken out of the disk device, when the small-diameter shaft 41b projecting through the recessed portion 1i of the top plate 1h of the case 1, i.e., the unlock-actuating member, is pushed by a finger, the lock shaft 41 slides downward in the direction Z against the resilient force of the torsional coil spring 43. At this time, the lock pawls 42 integrally formed on the lock shaft 41 are moved to respective spaces between the trays T adjacent each other and are disengaged from the latch projections T8 of all the trays T. Thus, all the trays T are released from the locked state established by the first lock mechanism L1.

Figure 10:
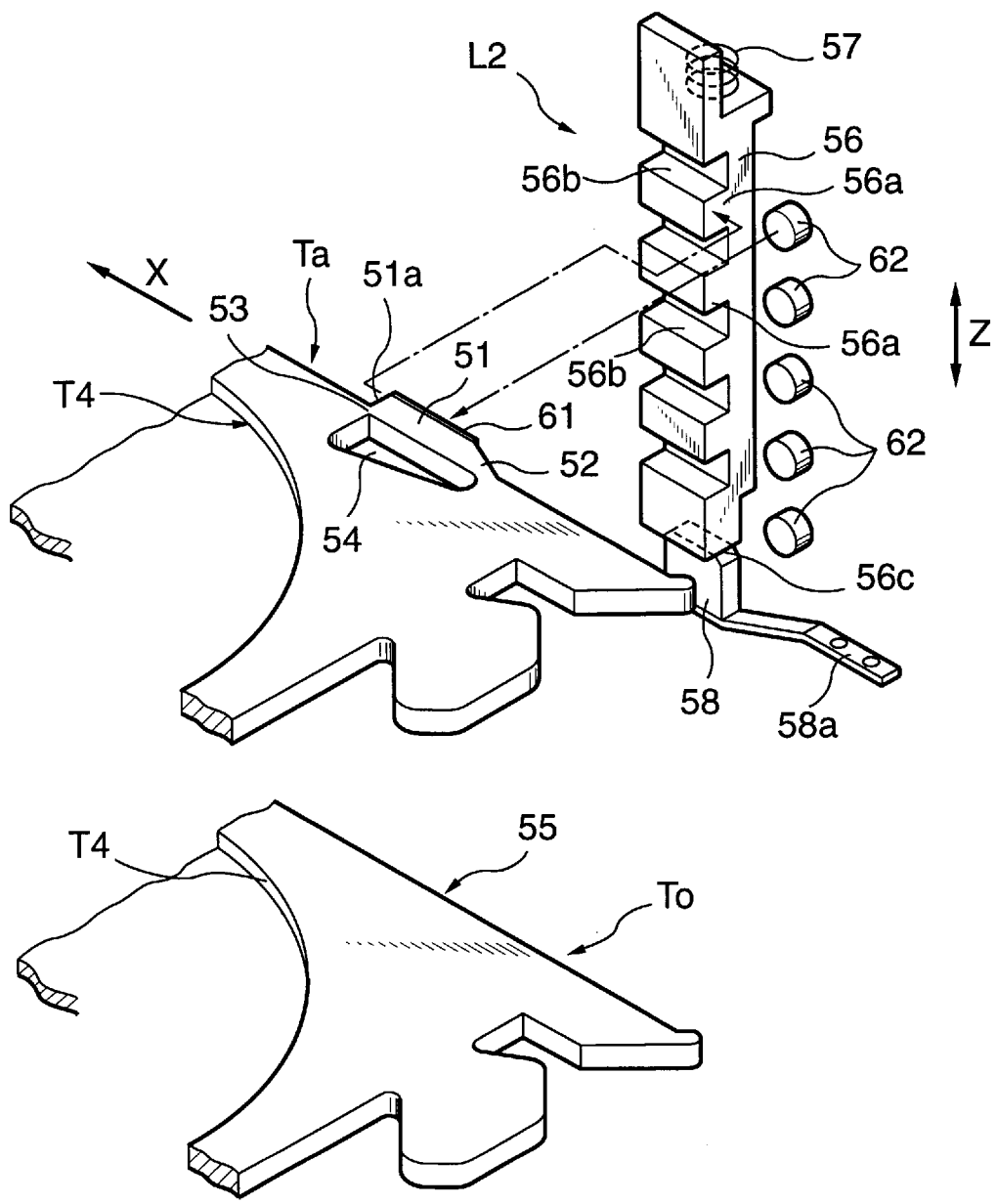
FIG. 10 is a partial exploded perspective view showing a second lock mechanism provided on the disk package.

FIG. 10 is a partial exploded perspective view showing the structure of the second lock mechanism L2, and FIGS. 11A and 11B are enlarged plan views showing the position relationship in different states between the second lock mechanism L2 and the tray on which a RAM disk is rested.

The second lock mechanism L2 is to lock only the trays T on which RAM disks are rested. For the sake of easier understanding, therefore, the tray on which a RAM disk is rested is denoted by Ta and the tray on which a ROM disk is rested is denoted by To in FIG. 10.

A projection 51 is formed on the tray Ta for a RAM disk along its side edge on the right side looking forward in the direction X. The tray Ta has a hole 54 bored in an area just inwardly of the projection 51 such that the projection 51 is joined to a body of the tray Ta through a deformable thin wall portion 52 and a separable thin wall portion 53. Then, an end surface of the projection 51 facing forward in the direction X serves as a latch surface 51a.

On the other hand, the projection 51 is not formed on the tray To for a ROM disk and a side edge 55 of the tray To on the right side has a rectilinear shape.

A lock member 56 is supported to be slidable in the direction Z (vertically) to extend between the bottom plate 1f and the top plate 1h of the case 1 of the disk package P in a thick wall portion of the right side plate 1c. Also, as shown in FIG. 10, a biasing spring 57 is disposed to press an upper end of the lock member 56 downward. Thus, the lock member 56 is urged to move downward in the direction Z by a resilient force of the biasing spring 57.

The lock member 56 has lock portions 56a and non-lock portions 56b formed alternately in the direction Z. The non-lock portions 56b are provided by forming grooves in the lock member 56 with certain intervals therebetween. The array pitch of the lock portions 56a in the direction Z is the same as that of the trays T.

In the state of the disk package P being taken out of the disk device, since the lock member 56 is urged to move downward in FIG. 10, the lock portions 56a are each positioned to face the latch surface 51a of the tray Ta for a RAM disk in the direction X, whereby the lock portion 56a and the latch surface 51a are engaged with each other for locking the tray Ta. When the disk package P is loaded into the loading area B of the disk device, a bottom surface 56c (see FIG. 5) of the lock member 56, which is accessible from the outside through the bottom plate 1f of the case 1, is pushed by an unlock member 58 (see FIG. 10) provided in the housing A, whereupon the lock member 56 is slightly moved upward in the direction Z so that the non-lock portion 56b is positioned in front of the latch surface 51a of the tray Ta for a RAM disk.

The unlock member 58 is constructed to be able to abut against the bottom surface 56c of the lock member 56 having a small area, as shown in FIG. 5, and push the lock member 56 into the interior of the case 1. The unlock member 58 is urged by a leaf spring 58a to move in the direction of pushing the lock member 56. Also, the unlock member 58 is driven by mechanical power in the direction of pushing the lock member 56.

As explained above, the second lock mechanism L2 functions such that when the disk package P is taken out and left outside the disk device, the lock portion 56a of the lock member 56 engages, from the front side, the latch surface 51a of the tray Ta on which a RAM disk is rested, whereby the tray Ta is locked and prevented from being drawn out of the case 1. Because the projection 51 is not provided on the tray To on which a ROM disk is rested, however, the tray To is not locked by the second lock mechanism L2. Further, when the disk package P is completely loaded into the loading area B of the housing A, the lock member 56 is pushed upward in FIG. 10 by the unlock member 58 provided in the loading area B so that the non-lock portion 56b of the lock member 56 is positioned to face the latch surface 51a of the tray Ta, thereby releasing the tray Ta on which a RAM disk is rested from the locked state.

Thus, in the state where the disk package P is loaded in the disk device, both the first lock mechanism L1 and the second lock mechanism L2 are not operating to establish the lock, allowing all the trays to be drawn out of the disk driving means E.

Also, when the disk package P is taken out and left outside the disk device, all the trays are locked by the first lock mechanism L1, and only the trays Ta on which RAM disks are rested are locked by the second lock mechanism L2. Accordingly, when the small-diameter shaft 41b at the upper end of the lock shaft 41, shown in FIG. 9, is pushed by a finger to release the lock established by the first lock mechanism L1, only the trays To on which ROM disks are rested and which are not locked by the second lock mechanism L2 are allowed to be drawn out of the case 1 for, e.g., replacement of the disks D. On the other hand, since the trays Ta on which RAM disks are rested are still locked and cannot be drawn out of the case 1, there is no fear that the recording surfaces of the RAM disks may be contaminated by hands, etc. As a result, the RAM disks can be surely protected.

Further, while the first lock mechanism L1 has the small-diameter shaft 41b projected out of the top plate 1h of the case 1 so that it can be pushed by a finger, the lock member 56 of the second lock mechanism L2 has a small section area and the bottom surface 56c (see FIG. 5) of the lock member 56, which is exposed to be accessible from the outside through the bottom plate 1f of the case 1, is very small. In the state where the disk package P is taken out of the disk device, therefore, it is difficult to push the bottom surface 56c by a finger; hence users cannot manually release the lock established by the second lock mechanism L2 with ease.

In addition, as shown in FIG. 3, a plurality of slits 1j are opened in the right side plate 1c of the disk package P, and the projection 51 of each tray Ta on which a RAM disk is rested is exposed to corresponding one of the slits 1j. Accordingly, by inserting a tool, e.g., a tip of a minus-end screwdriver and pushing the projection 51 on the side edge of the tray Ta, the thin wall portion 53 is broken to be separated from the side edge and the thin wall portion 52 is deformed, causing the projection 51 to collapse and come into the hole 54. As shown in FIGS. 11A and 11B, an inner surface 54a of the hole 54 on the front side in the direction X is formed into an inclined catch surface extending rearward (opposed to the direction X) as it approaches a right end in the figures, such that the projection 51 deformed to move into the hole 54 is caught by the inner surface 54a at its portion (i), as shown in FIG. 11B. As a result, the projection 51 is surely held collapsed in the hole 54 and kept from projecting laterally out of the side edge of the tray again.

In the state of FIG. 11B, since the latch surface 51a at the fore end of the projection 51 does not strike any longer against the lock portion 56a of the lock member 56, the tray Ta on which a RAM disk is rested is released from the locked state established by the second lock mechanism L2. Thus, by pushing the small-diameter shaft 41b to release the lock established by the first lock mechanism L1 in the state where the disk package P is taken out of the disk device, the tray Ta can be drawn out of the case 1 since the projection 51 is maintained in the collapsed state, as shown in FIG. 11(B). Consequently, a RAM disk can also be removed from the tray.

For the tray Ta in which the projection 51 is once collapsed, the projection 51 will never be restored to the original state. From that time, therefore, that tray can no longer be used as the tray Ta for a RAM disk. When that tray is to be used thereafter, a ROM disk is rested on it; namely, it is only used as a tray for a ROM disk.

Moreover, the type of the tray (i.e., whether the disk rested on the tray is a RAM disk or not) can also be detected by utilizing the projection 51 of the tray Ta for a RAM disk. As one example, a reflecting sheet 61 is attached to a lateral surface of the projection 51, and a photo-reflector 62 is provided as detecting means in the housing A in a position to face corresponding one of the slits 1*j* formed in the right side plate 1*c* of the case 1.

When the disk package P is loaded into the housing A, if light from any photo-reflector 62 is reflected by the reflecting sheet 61 and detected by the photo-reflector 62, it is recognized that the tray Ta on which a RAM disk is rested is present in the position of that photo-reflector 62. Also, for the tray Ta which is no longer used as a tray for a RAM disk with the projection 51 collapsed, as shown in FIG. 11B, it may be used as a tray for a ROM disk thereafter by peeling off the reflecting sheet 61 or by setting, e.g., an angle of orientation of the photo-reflector 62 such that the reflected light from the reflecting sheet 61 on the lateral surface of the projection 51 can not be received by the photo-reflector 62 after the projection 51 has been collapsed as shown in FIG. 11B.

As described hereinabove, according to the disk device of the present invention, since at least two or more types of disks, such as a RAM disk and a ROM disk, are loaded into the disk device together, it can be constructed as a device for playing back recording media of large capacity. With a RAM disk mixed in the loaded disks, the disk device can also be constructed as a device adapted for recording media making up a private library. In addition, the types of disks in the disk package can be recognized by the detecting means provided on the device body side and accessing the identification means provided on the case of the disk package. As a result, a variety of playback operations can be performed in accordance with the types of the disks identified.

What is claimed is:

1. A disk device into which is loaded a disk package accommodating at least two different types of multiple disks in a case, said disk device comprising:

drawing means for selecting one of the disks in said disk package and drawing the selected disk out of said case, disk driving means for driving the drawn-out disk, and detecting means for accessing identification means provided on said disk package and detecting the at least two different types of the disks in said case wherein trays each receiving one of the multiple disks and which are drawn out of said case are set in said case of said disk package, said drawing means selects and draws one of the trays out of said case, and said identification means is provided on each of said trays;

and wherein said drawing means and said detecting means for detecting said identification means provided on each of said trays are mounted on a selectively movable base moving in a direction in which said trays are arranged one above another in said case, and when said disk package is loaded into said disk device, said selectively movable base is moved in the direction of arrangement of said trays, causing said detecting means to successively access said identification means provided on each of said trays.

2. The disk device of claim 1 wherein said identification means is provided on a hook formed on each of said trays, and said detecting means for accessing said identification means is provided on said drawing means for applying a drawing force to said hook.

3. The disk device of claim 1 wherein the identification means comprises identification holes and the detecting means comprises detecting pins.

* * * * *